Patented Nov. 16, 1937

2,099,582

UNITED STATES PATENT OFFICE 2,099,582

BRAZING FLUX

Irving R. Valentine, Erie, Pa., assignor to General Electric Company, a corporation of New York No Drawing. Application February 7, 1935, Serial No. 5,500

6 Claims. (Cl. 148—26)

The present invention relates to a brazing flux and method of making it.

Standard flux materials are frequently lumpy and contain small crystals which interfere with the brazing operation.

It is one of the objects of the present invention to provide a flux which is substantially free from lumps, which is easy to work with and which is particularly adapted for use in silver brazing.

In carrying out my invention, about 40 parts by weight of water are added to about 78 parts by weight of potassium acid fluoride and the mixture boiled until the potassium acid fluoride is dissolved. About 31 parts of solid boric acid are then add to the mixture. The boric acid dissolves almost instantly after which the excess water is evaporated. This will leave a mixture having a volume substantially equal to that obtained originally with 40 parts water and 78 parts potassium acid fluoride. After evaporation of the excess water the mixture is cooled to room temperature. The product thus obtained is an unctious flux to which the water may be added to give any desired consistency. The flux manufactured as hereinbefore set forth is entirely free from lumps, very corrosive in action and protects the clean surfaces when a braze or weld is being made.

What I claim as new and desire to secure by Letters Patent of the United States, is:

1. An unctious flux containing about 78 parts by weight of potassium acid fluoride, about 31 parts by weight of boric acid and the remainder water.

2. A flux containing about 78 parts by weight of potassium acid fluoride, about 31 parts by weight of boric acid with the remainder water, said flux having a volume substantially equal to that obtained by adding 40 equivalent parts by weight of water to 78 equivalent parts by weight of potassium acid fluoride.

3. A flux consisting of potassium acid fluoride, boric acid and water, the quantity of potassium acid fluoride present in the flux being more than twice but less than three times the weight of the boric acid, the water being present in sufficient quantity to produce an unctious mass.

4. A flux consisting of a mixture of an acid fluoride of an alkali metal and boric acid with or without water.

5. A flux consisting of a mixture of a boric acid and an acid fluoride of metal from the group potassium and sodium with or without water.

6. A flux consisting substantially of boric acid and an acid fluoride of metal from the group potassium and sodium, said flux having the characteristics of the flux formed by dissolving 78 parts by weight of potassium acid fluoride in boiling water, adding 31 parts by weight of solid boric acid thereto and evaporating the water to obtain a desired consistency in the flux.

IRVING R. VALENTINE.